July 26, 1966  V. L. FRANTZ  3,262,464
DRAIN VALVE
Original Filed Dec. 20, 1961
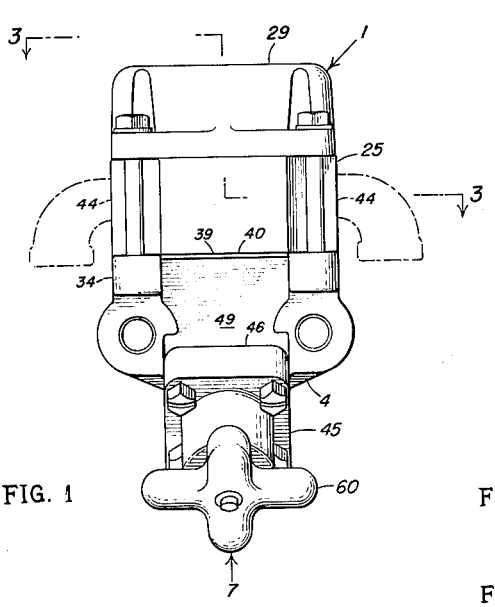
FIG. 1
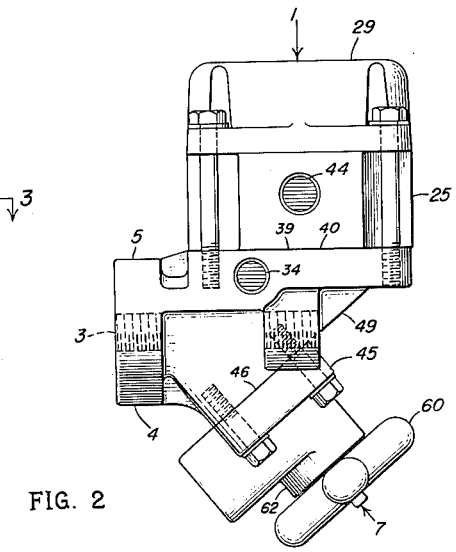
FIG. 2
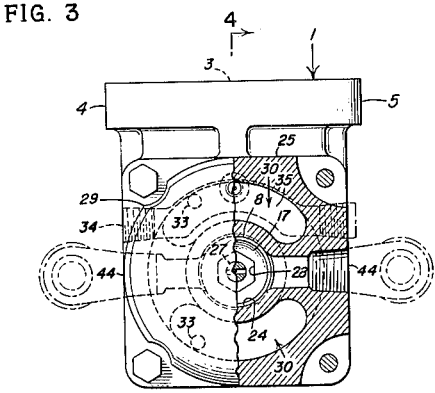
FIG. 3
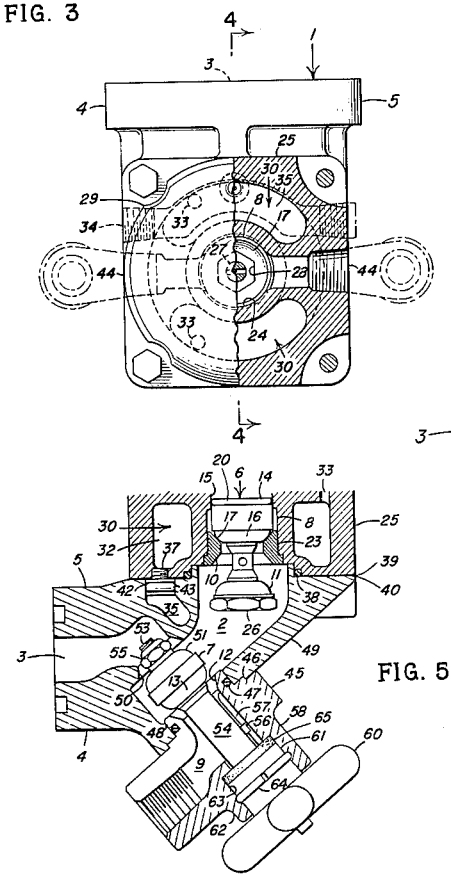
FIG. 5
FIG. 4
Inventor:
Virgil L. Frantz
By Wilmer Mechlin
his Attorney

United States Patent Office 3,262,464
Patented July 26, 1966

3,262,464
DRAIN VALVE
Virgil L. Frantz, Salem, Va., assignor to Graham-White Sales Corporation, Salem, Va., a corporation of Virginia
Original application Dec. 20, 1961, Ser. No. 160,866. Divided and this application Jan. 12, 1965, Ser. No. 426,473
7 Claims. (Cl. 137—204)

This invention relates to valves for draining condensate from pressurized reservoirs and this application is a division of my copending application Serial No. 160,866, filed December 20, 1961, now abandoned.

An object of the invention is to provide a drain valve which operates automatically to drain condensate from a reservoir intermediate the pumping and idling cycles of an associated compressor.

An additional object of the invention is to provide an automatic, pressure-actuated drain valve wherein the pressure chamber for the actuating air is built into the valve body about the valve, thereby eliminating the need for the usual separate pressure dome surmounting the body.

A further object of the invention is to provide an automatic drain valve wherein the pressure chamber is connected for charge and discharge to the unloader line of an associated compressor and the interchange of air between the reservoir and the pressure chamber for the actuating air is prevented not only normally by an interposed seal but in case of failure of that seal, thereby preventing interference by reservoir pressure with the operation of either the valve or the compressor.

Other objects and advantages of the invention will appear hereinafter in the detailed description, be particularly pointed out in the appended claims and be illustrated in the accompanying drawings in which:

FIGURE 1 is a front elevational view of a combined drain valve incorporating a preferred embodiment of the automatic drain valve of the present invention;

FIGURE 2 is a side elevational view of the valve of FIGURE 1;

FIGURE 3 is a view, partly in section, taken along lines 3—3 of FIGURE 1;

FIGURE 4 is a vertical sectional view on an enlarged scale, taken along lines 4—4 of FIGURE 3 with the valve set for automatic draining; and FIGURE 5 is a view on the section of FIGURE 4 but on the scale of the preceding figures, showing the valve set for manual draining in the interval in which the unloader line of the associated compressor is under pressure.

Referring now in detail to the drawings in which like reference characters designate like parts, the combined drain valve incorporating the automatic drain valve of this invention is applicable generally for draining condensate from a compressed gas from any container that is pressurized or under pressure in which the condensate has accumulated. However, the combined drain valve is particularly useful in the compressed air systems of locomotives and other vehicles for preventing corrosion, clogging or other damage to air actuated mechanisms by water, oil or other mainly liquid matter condensing from the compressed air and accumulating in the systems in reservoirs, sumps or other containers, herein termed generally "reservoirs."

The combined drain valve is comprised of a body, casing or housing 1 having a main or central chamber or cavity 2 and a main or condensate inlet port or passage 3 opening inwardly onto the central chamber. Designed during draining to receive and pass condensate accumulated in the reservoir (not shown) to which the valve is applied and under operating conditions at all times to be under or exposed to reservoir pressure, the inlet passage 3 is constantly open or fluid-connected to or in fluid communication with the interior of the reservoir through a suitable outlet in the reservoir's bottom portion. In the illustrated embodiment, this is accomplished by adapting the valve to be mounted on or attached directly to the reservoir adjacent the bottom, the base section or part 4 of the body 1 in which the inlet passage 3 is contained, for this purpose conveniently having a preferably integral flanged fitting or connector 5 about the outer or inlet end of the inlet passage which is boltable or otherwise releasably attachable or connectable to a suitable flanged fitting (not shown) on the end of the reservoir adjacent the latter's bottom.

Mounted at specified positions in the body 1 are a pair or plurality of spaced valves or valve members, one, 6, the automatic drain valve of this invention, automatic or automatically actuatable and the other, 7, manual or manually actuatable. Each of these valves is adapted normally or except when draining to block access, connection or communication between the main chamber 2 and one of a pair or plurality of spaced outlets or outlet passages in the body and open to atmosphere or ambient air, the outlet passages for the automatic and manual valves being designated, respectively, as 8 and 9. To this end, there is interposed between each of the outlet passages 8 and 9 and the main chamber 2 a valve seat, one, 10, for normally seating a valve element 11 of the automatic valve 6 and the other, 12, correspondingly seating a valve element 13 of the manual valve 7. Of the two valves, the automatic valve 6 is axially slidable or reciprocable in the body 1 for moving its valve element 11 into and out of engagement with the related seat 10, preferably by having a cylindrical stem 14 slidably received in a correspondingly configured guide bore 15 in the body above or outside of and coaxial with the seat.

With the above arrangement and the inlet passage 3 open to the main chamber 2, it is possible to drain condensate periodically from the reservoir through the associated or adjoining outlet passage 8 by actuating the automatic valve 6 at intervals or periodically by a timer-controlled solenoid (not shown). However, it ordinarily will be preferred to actuate the automatic valve by fluid pressure. In either case, the automatic valve may have an additional valve element 16 seatable, in alternation with seating of its first element 11, in a second valve seat 17, which, like the first seat 10, is interposed between the related outlet passage 8 and the main chamber 2, with the difference that the preferred, air-actuated automatic valve must have the second element and seat to enable it to limit the duration of the draining. Also, in the air-actuated version, the automatic valve 6 preferably is a differential piston with its larger or enlarged head 18 fixed to or rigid with the stem 14 and slidably received in an upwardly or outwardly opening cylinder or cylindrical socket 19 in the body 1, which is coaxial with but of larger diameter than and projects or extends upwardly or outwardly beyond the open-ended guide bore 15. Suitably sealed against passage of air around it, as by a pair of O-rings 20, one seated in a circumferential groove 21 in each of the stem 14 and head 18 and wiping against the surrounding bore 15 or socket 19, the automatic valve 6 normally is yieldably urged upwardly or outwardly, away from the main chamber 2, to hold its first, lower or inner valve element 11 in engagement with the related, lower or inner seat 10, as by a coil return spring 22 encircling the stem 14 and in and acting between the inner end of the socket 19 and the under or inner face of the head 18. Since otherwise sealed off, the socket 19 is ported to atmosphere to prevent interference by back pressure with movement of the automatic valve.

Although variation in the construction and arrangement of the valve elements 11 and 16 and their seats 10 and 17 is permissible, the automatic valve 6 is particularly effective if, as in the illustrated embodiment, the valve elements confront or face toward each other and straddle or embrace the seats and the latter in their turn face oppositely. Furthermore, the service life of the valve can be extended by forming the seats 10 and 17 as the opposite, preferably conically concave faces of a stainless steel or like corrosion-resistant, annular insert or sleeve 23 threaded or screwed into an aperture 24 off the main chamber 2, the upward or outward extension of which, intermediate the seat insert and the guide bore 15, constitutes the related exhaust passage 8, and the valve elements are arcuately convex and made of "Teflon" or like wear-resistant material. To permit access to the seat insert 23, as well as to facilitate replacement of that insert and the valve elements 11 and 16, the part 25 of the body 1, housing or containing the automatic valve, is made as a separate section bolted or otherwise releasably attached to the base section 4 and the lower, inner or smaller head 26 of the valve is the head of a bolt threadedly connected to a spool or spacer 27 similarly connected to the stem 14 and interposed between and axially spacing the valve elements. As shown, the head 26 may be hex- or like sided, the spool 27 radially apertured and the seat insert 23 notched about its axial bore 28 for the application of tools for turning them.

The combined drain valve has a cap or cover 29 forming part of its body 1 and surmounting and bolted or otherwise releasably attached to the upper or outer section 25 housing the automatic valve 6, but, contrary to the construction of the usual air-actuated valve, the cap is part of the body and does not entirely contain the pressure chamber or reservoir 30 for the actuating air. Instead, the pressure chamber 30 is contained in part in the cap 29 and in balance in the upper section 25 and surrounds or encircles and is substantially coterminous vertically, longitudinally or axially with both the automatic valve 6 and its valve chamber formed by the socket 19, guide bore 15 and aperture 24. The upper and lower or inner and outer parts 31 and 32, respectively, of the presence chamber 30, the former surrounding or encircling the socket 19 and outer part of the guide bore 15 and the latter the inner part of the bore and the insert-receiving aperture 24, are suitably connected by a drilling or like connecting passage 33 extending through the intervening wall of the outer section outwardly of the socket. Again contrary to normal practice, the inlet port or passage 34 for the actuating air, in installations of the drain valve in large volume compressed air systems, such as those of locomotives, leads not directly to the pressure chamber 30 but to an intermediate or entrance chamber 35 in the base section 4 and flows between the two chambers through a restricted orifice 36 in a headed plug 37. For the average diesel locomotive, the orifice 36 may have a diameter of about .025", its purpose being to prolong the interval during which the outlet passage 8 is connected to the main chamber 2 by impeding or retarding the interchange of air between the intermediate and pressure chambers 35 and 30 and correspondingly retarding or delaying the movement of the automatic valve 6 in alternately seating its valve elements 11 and 16 in their respective seats 10 and 17.

At least in diesel locomotive applications, the actuating air for the automatic valve 6 is not intended to be supplied either by the associated reservoir (not shown) or through the loader line from the compressor (not shown), since in such an application the compressor ordinarily runs constantly and the permissive pressure drop in the reservoir and thus the loader line is only about 20 p.s.i., from around 140–120 p.s.i. This is too small a drop for assured operation of the automatic valve, but an adequate differential, from the same maximum to atmospheric pressure, is available by connecting the inlet passage 34 to the unloader line (not shown) of the compressor. Although the unloader line of one of the two types of compressors in general use is at output pressure when the compressor is in its pumping cycle and of the other type is at atmospheric pressure during that cycle, in both types the pressure in the unloader line shifts between output and atmospheric with the shifts of the compressor from its pumping to its unloaded cycle and vice versa.

The use of the unloader line to supply the actuating air and the introduction of that air into the base section 4 containing the main chamber 2 and thence through the joint between the base section and the outer section 25, could pose a problem of large magnitude. When the combined drain valve is set for automatic operation, the main chamber, as well as the condensate inlet passage 3, is at reservoir pressure and, should that pressure leak into the pressure and intermediate chambers 30 and 35, the automatic valve 6 would be held against operation in its down or in position. Also, if the associated compressor is of the type which pumps so long as its unloader line is under pressure, the pressure in the system will continue to build up until something bursts.

The main obstacle to such leakage is the interposed O-ring or like gasket 38 in the joint 39 between the base and outer sections 4 and 25, which is about, surrounds or encircles the outer end of the main chamber 2 and separates the latter from the pressure and intermediate chambers 30 and 35. However, even should this fail, the failure will not affect the operability of the present drain valve. This is accomplished by providing an atmospheric pressure block or backstop in the form of an outlet to atmosphere between the main chamber 2 on the one hand and the intermediate and pressure chambers 35 and 30 on the other. The atmospheric outlet may be one or more grooves extending radially along the joint 39 outwardly of the gasket 38, but, as in the illustrated embodiment, may be simply the slight gap or spacing, indicated at 40, in the joint which extends radially outwardly from the gasket to the exterior of the body 1 and is readily obtained by having an unmachined fit between the sections over that area. With the stem 41 of the preferred metering plug 37 threaded into the outer section 25 and its head 42 socketed in the base section 4 and carrying an O-ring or like seal 43 in its periphery, the relative freedom with which any fluid leaking from the main chamber 2 can leak to atmosphere through the gap 40, affords ample protection against leakage of such fluid into the pressure and intermediate chambers 30 and 35.

Constructed in the above manner and with its pressure chamber 30 connected through the intermediate chamber 35 to the unloader line of the associated compressor, the automatic valve 6 will shift from its upper, outer or normal position to its lower or inner position or vice versa on each change in cycle of the compressor. During the cycle, whether pumping or idling, in which the unloader line is unloaded and open to atmosphere, the valve 6 will be held by the return spring 22 in its outer position with its inner valve element 11 seated in the inwardly facing inner seat 10. Conversely, when the unloader line is under the positive output pressure of the compressor, the pressure in the pressure chamber, once it has built up to that in the unloader line, will hold the valve in its inner position against the opposing forces of the return spring 22 and the pressure in the main chamber 2 on its smaller or inner head 26. In either case, the exhaust passage 8 is cut or shut off from the main chamber 2. However, the passage and chamber are connected in the intervals, incident to cycle changes, in which the valve is shifting between positions as actuating air is being fed into or exhausted from the pressure chamber in equalizing its pressure with that in the unloader line. It is at these intervals that the automatic valve will drain condensate from the reservoir through the exhaust passage 8 and its connection to atmosphere, here, the pair of opposed exhaust vents or ports 44, so long as the reservoir is under positive pressure and the condensate inlet 3 is connected to the main chamber.

Like the automatic valve 6, the manual valve 7, to facilitate maintenance, is mounted, carried or housed and its exhaust passage 9 is housed or contained in a section or part 45 of the body 1 separable from and removably attached to the base section 4. Termed for convenience the lower, second outer or manual valve section, this section 45 and the base section 4 have the joint or interface 46 between them sealed fluid-tight by an O-ring or like seal 47, conveniently carried by a necked portion or annular projection 48 of the lower section, which, in the preferred embodiment fits in and projects through the confronting part of the wall 49 of the base section and carries or has at its inner end the preferably tapered, inwardly facing, outer or lower valve seat 12 in which the manual valve normally seats. The manual valve also has another or inner seat 50, in which and the first or outer, 12, it is alternately seatable. These seats are coaxial and oppositely facing, the outer 12 surrounding the opening between the main chamber 2 and the exhaust passage 9 and the inner 50 the opening between the condensate inlet 3 and the main chamber, with the axial spacing between them such that one or the other will be closed or both open, depending on the position of the valve.

The preferred construction of the manual valve 7 provides maximum service life with ease of maintenance. The valve has two oppositely facing valve elements 13 and 51, respectively, one for each of the seats 12 and 50. Both the inner element 51 and the outer element 13 are preferably arcuately convex to fit the preferred concave, tapered or frusto-conical seats and the elements are mounted back-to-back with an intervening washer or spacer 52 on a reduced inner end portion 53 of a valve stem 54 on which they are releasably held by a nut 55.

For minimum wear, it is quite important that the valve elements and their seats be held against relative rotation so as not to abrade each other as the elements seat and unseat. To this end, the stem 54 is keyed or otherwise fixed against rotation relative to the body 1, as by a key 56 fixed to or rigid with the stem and riding in a keyway or slot 57 extending parallel to the stem in the wall 58 of the lower body section 45. In turn, the stem projects through the wall of the lower section and, therebeyond, has its outer end portion 59 threaded for threaded engagement with, rather than fixing to, an internally threaded handle 60 mounted on the outside of the section for rotation but against axial movement relative to the section, suitably by socketing a hub 61 of the handle in an external boss 62 on the section and locking the hub against axial movement relative to the socket 63 in the boss by an interposed snap or locking ring 64. Mainly to prevent interference with operation of the valve by foreign matter accumulating in the socket 63, packing 65 preferably is interposed between the confronting inner ends of the socket and the hub 61.

In the operation of the combined automatic and manual valve, the manual valve 7 will ordinarily be in the position shown in FIGURE 4 in which it closes the opening between the exhaust passage 9 and main chamber 2 but leaves the latter open or connected to the condensate inlet 3. In this position of the manual valve 7, the automatic valve 6 will operate automatically, as the cycles of the associated compressor change, to drain condensate from the reservoir through its exhaust passage 8 and atmospheric vent or vents 44. If, instead, it is desired to drain the condensate manually, the handle 60 of the manual valve 7 is turned to shift the latter to a position in which its valve elements 13 and 51 are between and disengaged or spaced from both seats, the condensate then draining through the condensate inlet 3, the main chamber 2 and the exhaust passage 9 of the manual valve. The third possible setting of the combined valve, also controlled or determined by the manual valve, is with the manual valve shifted to its inner position in which its inner valve element 51 is seated in the related inner valve seat 50. In this position, the main chamber 2 is closed to or cut or shut off from the condensate inlet 3. This last position not only blocks drainage of the reservoir by closing the one opening common to the exhaust ports, but, by connecting the main chamber to atmosphere rather than to reservoir pressure, enables the upper section 25 housing the automatic valve to be removed for maintenance work without bleeding the reservoir or fear of injury to the operator.

From the above detailed description of the invention, it will be apparent that there has been provided an automatic drain valve which improves in many respects on prior drain valves. It should be understood that the illustrated embodiment is merely exemplary of the invention and that all modifications are intended to be included that do not depart from the spirit of the invention and the scope of the appended claims.

Having described my invention, I claim:

1. In a drain valve for a pressurized reservoir, the combination of a body, a valve chamber in said body, pressure-responsive valve means in and shiftable axially of said chamber for engaging and disengaging related valve seat means, a pressure chamber in said body and open to an end of said valve chamber, said pressure chamber surrounding and being substantially coextensive vertically with said valve chamber, a pressure inlet in said body and connected to said pressure chamber, and a restricted orifice in said body in the connection between said inlet and chamber pressure.

2. In a drain valve for a pressurized reservoir, the combination of a body, a valve chamber in said body, pressure-responsive valve means in and shiftable axially of said chamber for engaging and disengaging related valve seat means, a pressure chamber in said body and formed of a plurality of fluid-connected sections each encircling and together substantially coextensive axially with said valve chamber, one of said sections being open to an end of said valve chamber, a pressure inlet connected to the other section, and a restricted orifice in the connection between said other section and inlet.

3. In a drain valve for a pressurized reservoir, the combination of a valve body having a base section and an outer section releasably attached to said base section, a main chamber in said base section and fluid-connectable to said reservoir, a valve chamber in said outer section, pressure-responsive valve means in said valve chamber and shiftable axially relative thereto for engaging and disengaging related valve seat means, said valve chamber including an exhaust passage connectable through said seat means to said main chamber, a pressure chamber in said outer section and surrounding and open to an end of said valve chamber, a pressure inlet passage in said base section and having connection through a joint between said sections with said pressure chamber, sealing means in said joint about an adjoining end of said main chamber and inwardly of said connection, and an atmospheric opening in said joint extending from said sealing means to an exterior of said body.

4. In a drain valve for a pressurized reservoir, the combination of a valve body having a base section and an outer section releasably attached to said base section, a main chamber in said base section and fluid-connectable to said reservoir, a valve chamber in said outer section, pressure-responsive valve means in said valve chamber and shiftable axially relative thereto for engaging and disengaging related valve seat means, said valve chamber including an exhaust passage connectable through said seat means to said main chamber, a pressure chamber in said outer section and surrounding and open to an end of said valve chamber, a pressure inlet passage in said base section and having a connection with said pressure chamber through a joint between said sections, sealing means in said joint about an adjoining end of said main chamber, and an atmospheric gap in said joint about said sealing means and extending therefrom outwardly to an exterior of said body.

5. In a drain valve for a pressurized reservoir, the combination of a valve body having a base section and an outer section releasably attached to said base section, a main chamber in said base section and fluid-connectable to said reservoir, a valve chamber in said outer section, pressure-responsive valve means in said valve chamber and shiftable axially relative thereto for engaging and disengaging relative valve seat means, said valve chamber including an exhaust passage connectable through said seat means to said main chamber, a pressure chamber in said outer section and surrounding and open to an end of said valve chamber, a pressure inlet passage in said base section, a plug means extending through a joint between said sections and having an orifice fluid-connecting said inlet passage and pressure chamber, sealing means in said joint about an adjoining end of said main chamber and inwardly of said plug means, and an atmospheric opening in said joint extending from said sealing means to an exterior of said body.

6. In a drain valve for a pressurized reservoir, the combination of a valve body having a base section and an outer section releasably attached to said base section, a main chamber in said base section and fluid-connectable to said reservoir, a valve chamber in said outer section, pressure-responsive valve means in said valve chamber and shiftable axially relative thereto for engaging and disengaging axially spaced valve seats, said valve chamber including an exhaust passage connectable through said seats to said main chamber, a pressure chamber in said outer section and surrounding and open to an end of said valve chamber, a pressure inlet passage in said base section, a plug extending through a joint between said sections intermediate said inlet passage and pressure chamber and having a head sealingly socketed in one and a stem threaded into the other of said section, an axial orifice in said plug fluid-connecting said passage and pressure chamber, and an atmospheric gap in said joint about said sealing means and extending therefrom outwardly to an exterior of said body.

7. In a drain valve for a pressurized reservoir, the combination of a valve body having a base section and an outer section releasably attached to said base section, a main chamber in said base section and fluid-connectable to said reservoir, a valve chamber in said outer section, a seat insert releasably threaded into said valve chamber, oppositely facing axially spaced valve seats on said insert, pressure-responsive valve means in said valve chamber and shiftable axially relative thereto for engaging and disengaging said valve seats, said valve chamber including an exhaust passage connectable through said seats to said main chamber, a pressure chamber in said outer section and surrounding and open to an end of said valve chamber, a pressure inlet passage in said base section and having a connection through a joint between said sections with said pressure chamber, sealing means in said joint about an adjoining end of said main chamber and inwardly of said connection, and an atmospheric opening in said joint extending from said sealing means to an exterior of said body.

References Cited by the Examiner
UNITED STATES PATENTS

| | | | |
|---|---|---|---|
| 2,509,879 | 5/1950 | Pelton | 137—204 |
| 2,509,880 | 5/1950 | Pelton | 137—204 |
| 2,619,111 | 11/1952 | Renick | 137—489 |
| 2,803,451 | 8/1957 | Aldinger | 137—489 X |
| 3,042,057 | 7/1962 | Zorgdrager | 251—62 X |

MARTIN P. SCHWADRON, *Primary Examiner.*

ALAN COHAN, ISADOR WEIL, *Examiners.*